United States Patent [19]

Doljack

[11] Patent Number: 5,369,247

[45] Date of Patent: Nov. 29, 1994

[54] SELF-REGULATING ELECTRICAL HEATER SYSTEM AND METHOD

[76] Inventor: Frank A. Doljack, 750 Montevino Dr., Pleasanton, Calif. 94566-6318

[21] Appl. No.: 968,169

[22] Filed: Oct. 29, 1992

[51] Int. Cl.⁵ ............................................... H05B 1/02
[52] U.S. Cl. ................................... 219/485; 219/481; 219/504; 219/505; 219/497; 307/117
[58] Field of Search ................ 219/483, 481, 486, 485, 219/504, 505, 497, 495, 528, 546, 508, 511; 307/117, 39, 40

[56] References Cited

U.S. PATENT DOCUMENTS

| | | |
|---|---|---|
| 3,794,950 | 2/1974 | Kilner ................................. 219/322 |
| 4,256,945 | 3/1981 | Carter et al. . |
| 4,322,604 | 3/1982 | Kawamura et al. . |
| 4,375,205 | 3/1983 | Green . |
| 4,478,076 | 10/1984 | Bohrer . |
| 4,498,337 | 2/1985 | Gruner . |
| 4,548,077 | 10/1985 | van Putten . |
| 4,554,439 | 11/1985 | Cross et al. . |
| 4,570,054 | 2/1986 | Chidzey et al. . |
| 4,685,331 | 8/1987 | Renken et al. . |
| 4,699,738 | 10/1987 | DePetris .................. 219/511 |
| 4,780,598 | 10/1988 | Fahey et al. . |
| 4,795,886 | 1/1989 | Carter . |
| 4,808,009 | 2/1989 | Sittler et al. . |
| 4,845,343 | 7/1989 | Aune et al. ........................... 219/545 |
| 4,849,611 | 7/1989 | Whitney et al. .................... 219/505 |
| 4,870,745 | 10/1989 | Lee . |
| 4,934,349 | 6/1990 | Demizu . |
| 5,189,283 | 2/1993 | Carl, Jr. et al. ..................... 219/508 |

OTHER PUBLICATIONS

Electrical Engineering p. 718 (Transactions) Becker, Green, Pearson–Thermistors.
Midwest Components Inc. Application Data–Section 1001 NTC Temperature Compensation.
Industrial Heating, Sep. 1992, pp. 28–30, Howes Control of Silicon Carbide Heating Elements Using SCRs.

Primary Examiner—Mark H. Paschall
Attorney, Agent, or Firm—Renner, Otto, Boisselle & Sklar

[57] ABSTRACT

A self-regulating heater including a resistance element for converting electrical power to thermal energy and a power supply includes circuitry for controlling its output during heat up along a path bounded by two preferred paths:

1) a path defined by constant voltage with a crossover to constant current for a NTCR heater element when the power output reaches a maximum or a path defined by constant current with a crossover to constant voltage for a PTCR heater element when the power output reaches a maximum; and 2) a path defined by constant power with a cross-over to maximum current for a NTCR heater element or to constant voltage for a PTCR heater element when the power supply reaches maximum current or maximum voltage output respectively. When the heater element reaches the set control temperature, the power supply then maintains power equilibrium with the thermal load through controlling its output according to resistance control, i.e., controlling the current and voltage to maintain the resistance of the heater element at the set point resistance (reference resistance). A related method is also disclosed.

14 Claims, 8 Drawing Sheets

SELF-REGULATING ELECTRICAL HEATER SYSTEM AND METHOD

CROSS-REFERENCE TO DISCLOSURE DOCUMENT

Reference is made to Disclosure Document No. 266030, filed on Oct. 30, 1990. The benefits of such Disclosure Document are hereby claimed.

FIELD OF THE INVENTION

The invention relates to thermal systems and methods of providing and controlling thermal energy, and, more particularly, to a self-regulating electrical heater system and method having fast response and accurate control over a broad range of selected temperatures.

BACKGROUND OF THE INVENTION

Self-regulating heater systems operate a heating element or elements at a controlled temperature without the necessity of a separate temperature sensor, such as a thermocouple or thermostat. Such a system utilizes a heater element which exhibits a large temperature coefficient of resistance (TCR), i.e., a large change in the resistivity of the heater element for a relatively small change in the temperature of the heater element, in the temperature range at which the heater system is intended to operate. The heater element may have a negative temperature coefficient of resistance (NTCR) in which the resistivity of the heater element decreases as temperature increases or a positive temperature coefficient of resistance (PTCR) in which the resistivity of the heater element increases as temperature increases. Conventionally, during heat up, a heater system employing a NTCR heater element would typically power its heater element at a constant current, while a heater system employing a PTCR heater element would typically power its heater element at a constant voltage.

These self-regulating heater systems indirectly sense the temperature of the heater element by measuring the resistance of the heater element. Therefore, since the resistance of the heater element is known for a particular temperature, the temperature of the hearer element can be determined and regulated. Some prior an self-regulating heater systems operate at only one specific temperature as determined by the TCR properties of the heater element. Consequently, when it is desired to operate the system at a different temperature, the heater element must be replaced. Other prior art systems continuously monitor the resistance of the heater element and adjust the voltage or current to the heater element to provide a small degree of temperature settability. Some of these systems supply either a constant voltage or constant current until the heater element reaches the set temperature, whereupon the power supply converts to resistance control to maintain the temperature at this set point. A need exists, however, for heater systems that have shorter heat up times and better temperature control than that afforded by prior art systems.

SUMMARY OF THE INVENTION

The heater system of the present invention provides for faster heat-up and improved temperature control than conventional heater systems, and further can be settable to a broad range of temperatures.

In accordance with one aspect of the invention, a self-regulating heater includes a NTCR/PTCR resistance element for converting electrical power to thermal energy; and a power supply for supplying electrical power to the NTCR/PTCR resistance element; the power supply controlling the electric power supplied to the NTCR/PTCR resistance element along a first path bounded by second and third paths, the second path defined by constant voltage for a NTCR resistance element or by constant current for a PTCR resistance element with a cross-over to constant current for a NTCR resistance element or to constant voltage for a PTCR resistance element when the power output reaches a maximum, and the third path being defined by constant power with a cross-over to maximum current for a NTCR resistance element or to maximum voltage for a PTCR resistance element when the power supply reaches maximum current for a NTCR resistance element or maximum voltage for a PTCR resistance element.

In accordance with a further aspect of the invention, a method of supplying electrical power to a NTCR/PTCR resistance heating element includes the step of controlling such electrical power along a first path bounded by second and third paths, said second path defined by constant voltage for a NTCR resistance element or by constant current for PTCR resistance element with a cross-over to constant current for a NTCR resistance element or to constant voltage for a PTCR resistance element when the power output reaches a maximum, and said third path being defined by constant power with a cross-over to maximum current for NTCR resistance element or to maximum voltage for a PTCR resistance element when the power supply reaches maximum current for a NTCR resistance element or maximum voltage for a PTCR resistance element.

In accordance with a still further aspect of the invention, a self-regulating power supply for use with a TCR heater element includes a source of electrical power and a control circuit, the control circuit controls the voltage and current supplied by the source of electrical power to the heater element such that upon heat up of the heater element one of the supplied voltage and current is first maintained at a preselected maximum until a preselected maximum power level is attained, at which point the other of the supplied voltage and current is maintained at a preselected maximum at least until a reference resistance is reached, the reference resistance corresponding to a selected temperature to be maintained by the heater.

In accordance with another aspect of the invention, a self-regulating power supply for use with a TCR heater element includes a source of electrical power and a control circuit, the control circuit controls the voltage and current supplied by the source of electrical power to the heater element such that upon heat up of the heater element the voltage and current are controlled to apply preselected maximum power until a preselected maximum current level is attained, at which point supplied current is maintained at the preselected maximum current until a reference resistance is reached, the reference resistance corresponding to a selected temperature to be maintained by the heater.

The foregoing and other/htures of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
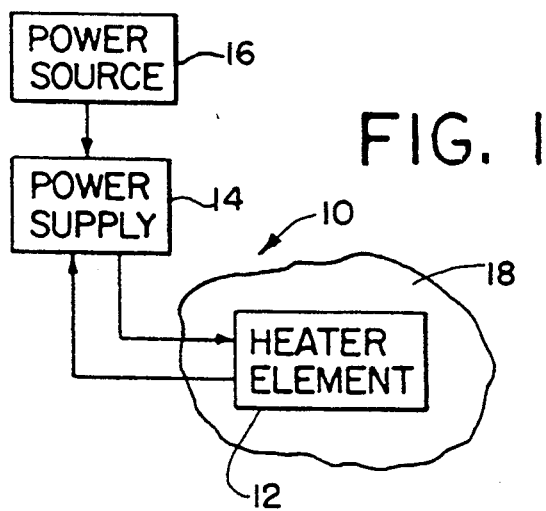
FIG. 1 is an illustration of a typical self-regulating electrical heater system.

With reference to the several figures in which like reference numerals represent like items, and initially to FIG. 1, there is shown a self-regulating heater system 10. Typically, self regulating heating 10 include a heating element 12, the resistance of which varies as a function of temperature, and a power supply 14 for controlling the supply of electrical power from a power source 16 to the heater element. The heater element 12 converts the supplied electrical power to thermal energy as a function of the square of the current multiplied by the resistance of the heating element. The thermal energy is in turn dissipated by the element 12 to the environment 18. Since the resistance of the heater element varies as a function of the temperature of the heating element, by sensing the resistance, the temperature of the heater element 12 can be determined and controlled.

Figure 2A:
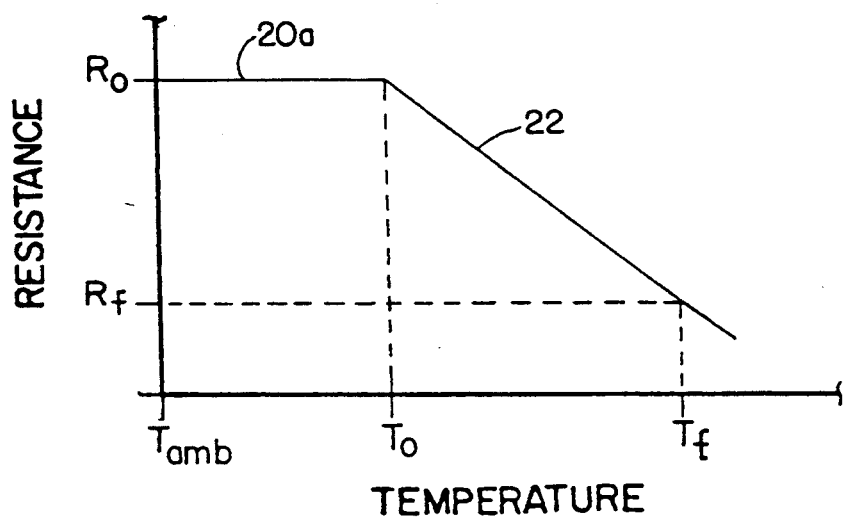
FIGS. 2a and 2b are graphs of resistance as a function of temperature illustrating the resistance-temperature characteristics of NTCR heater elements.

To explain in more depth how a typical self regulating heater system functions, consider FIG. 2a which illustrates the resistance-temperature characteristics for NTCR heater element 12. (FIG. 2b and what it depicts are similar to FIG. 2a and are described further below.) While this discussion is made relative to a NTCR heater, the same principles apply to a PTCR heater. In FIG. 2a the vertical axis represents the resistance of the heater element 12 while the horizontal axis represents the temperature of the heater element. $R_o$ represents the initial resistance of the heater element 12 at temperatures below the temperature where the resistance of the material substantially changes as a function of temperature; $R_f$ represents the resistance of the heater element at the maximum set temperature, i.e., the maximum temperature at which the heater element is to be maintained; $T_o$ represents the temperature at which the temperature coefficient of resistance of the material undergoes a substantial change; $T_f$ represents the maximum set temperature at which the heater element is to be operated; and, $T_{amb}$ represents the ambient temperature of the environment 18 in which the heater system will be employed. Applying electrical energy to the heater element 12 exhibiting NTCR properties will cause the temperature of the heater element 12 to increase as the power is converted to thermal energy and dissipated to the surrounding environment. The heater element 12 typically will continue to increase in temperature along the line 20a at relatively constant resistance $R_o$ until the heater element reaches the temperature $T_o$ at which point the resistance of the material begins to substantially change as a function of temperature. Change in resistance as a function of temperature is illustrated along the line 22, which is represented in a linear fashion. Typical NTCR heater elements will however often exhibit non-linear resistance-temperature relationships. Also, in some applications $T_o = T_{amb}$, as where the selected heater element does not have a region of relatively unchanged resistance extending above $T_{amb}$. A particular material will be chosen for the heater element so that it will operate along the line 22 (where the resistance of the material varies as a function of temperature) in the desired range of operating temperatures.

Figure 3A:
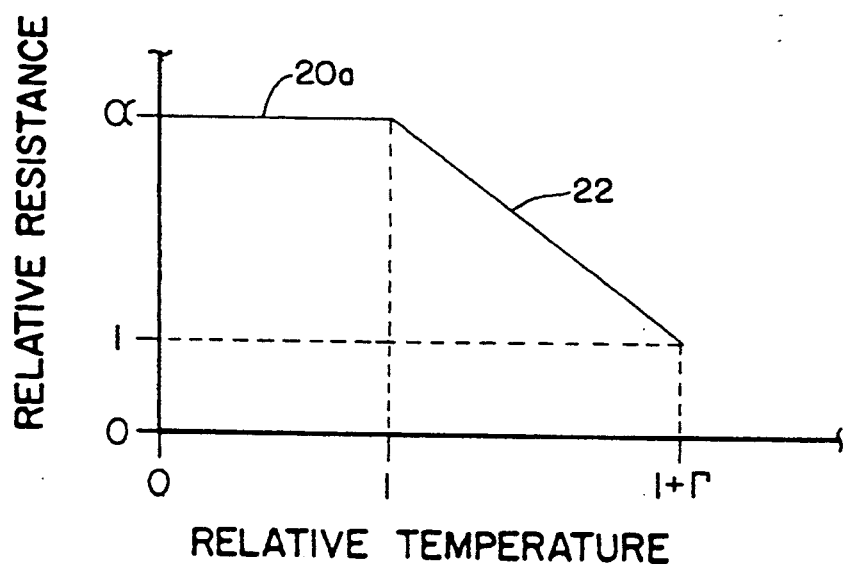
FIGS. 3a and 3b are graphs of relative resistance as a function of relative temperature illustrating the parameterized resistance-temperature characteristics of NTCR heater elements.

FIG. 3a illustrates the resistance-temperature characteristics of an NTCR heater element in a parameterized fashion. (FIG. 3b and what it depicts are similar to FIG. 3a and are described further below.) In FIG. 3a, $\alpha$, the resistance ratio, is defined as $\alpha = R_o/R_f$ and $\Gamma$, the normalized temperature range, is defined as $\Gamma = (T_f - T_o)/(T_o - T_{amb})$. For an NTCR heater $\alpha$ is generally (and preferably) greater than 3 and often significantly higher. The temperature range of settability for the heater system 10 will be dependent mostly on the intended objectives of the application for which the heater system is to be applied. For example, applications involving heating of living tissue do not typically exceed 40° C. Therefore, the settable range for a heater system designed to heat living tissue may be from an ambient of, say, 20° C. to a maximum of 40° C. In such a case $\Gamma$ is a very large value near infinity. For warming and cooking foods, the settable range of the heater element may be from 40° C. to 280° C. A heater element designed to operate over this relatively large temperature range would have a large $\Gamma$, for example, 12 or higher. In the case of soldering electrical components, the settable range of temperature may be from 280° C. to 380° C. Therefore, a soldering iron would employ a heater element 12 with a $\Gamma$ of, say, 0.38. As can be seen, heater systems 10 are designed with a temperature range corresponding to the application in which they will be used.

Figure 4:
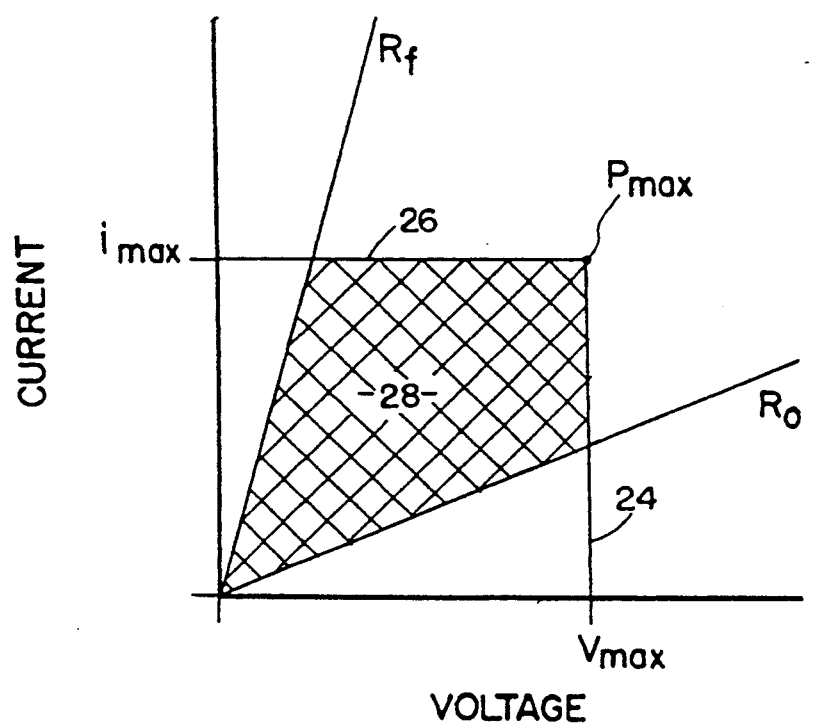
FIG. 4 is a graph of current as a function of voltage illustrating the maximum current-voltage properties for a practical power source.

Referring now to FIG. 4, there is shown a graph of current as a function of voltage, current being represented by the vertical axis and voltage being represented by the horizontal axis. FIG. 4 represents the maximum current ($i_{max}$) and maximum voltage ($V_{max}$) for a given power supply. In all applications of heater systems there is some limitation or limitations which determine the maximum available power, $P_{max}$, which the power supply can deliver. The limitation(s) may be economic since larger power ratings generally result in increased cost, or the limitation(s) may be based on size and weight which generally increase as the power rating is increased. In FIG. 4 the straight line labeled $R_o$ represents the constant resistance $R_o$, the resistance of the heater element at temperatures below the temperature where the resistance of the material substantially changes its function of temperature (or the resistance of the heater element at the minimum temperature of the selected range), and $R_f$ represents the resistance of the heater element at its maximum set temperature. The maximum voltage $V_{max}$ and maximum current $i_{max}$ are shown by lines 24 and 26, respectively. Usually the maximum current is set somewhat below a current at which the components of the power supply system may be damaged. The maximum voltage is usually set by system design and application objectives. When employed in connection with a heater element 12, the power supply 14 will be constrained to operate within the crosshatched region 28 bounded by the maximum voltage line 24, the maximum current line 26, and the lines representing constant resistances $R_o$ and $R_f$. Thus, the power supply 14 is designed to bring the heater element 12 from a point lying on the line $R_o$ to a point lying on the line $R_f$ by following a path lying within the crosshatched region 28.

Figure 5:
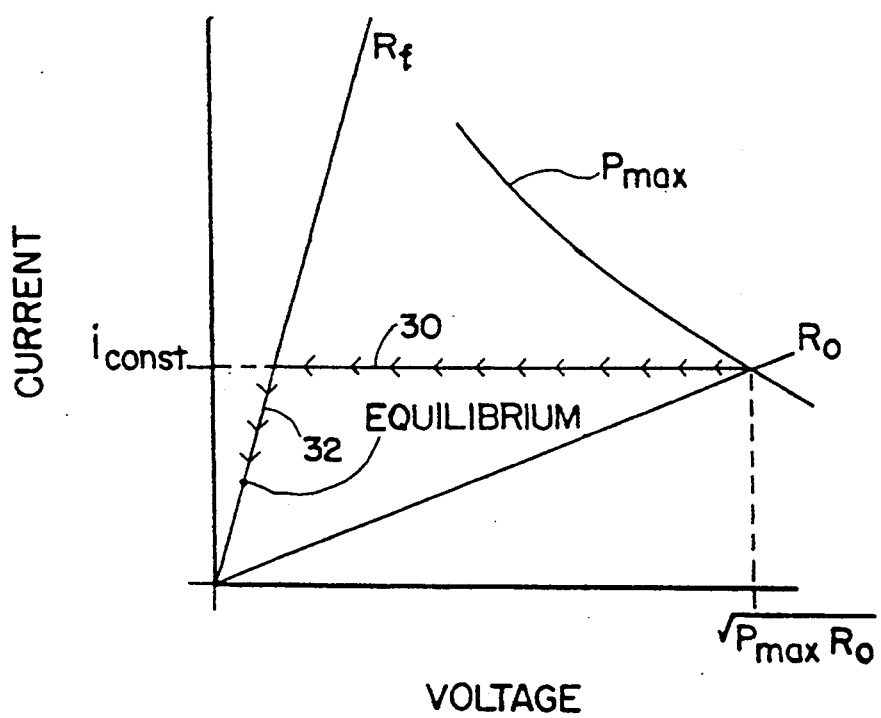
FIG. 5 is a graph of current as a function of voltage and illustrates operation of a prior art constant current self-regulating heater system.

Referring to FIG. 5, there is shown a control path which a prior art NTCR heater system operating at constant current would typically follow. A heater system 10 of this type would have a power supply 14 designed to provide a maximum voltage $V_{max}$ of at least $\sqrt{(P_{max}*R_o)}$ and a current at least as great as that needed to operate the heater element 12 at the maximum power $P_{max}$ when the voltage equals $\sqrt{(P_{max}*R_o)}$. At the initial stages of heat up the heater element 12 will have a resistance of $R_o$ and the applied constant current $i_{const}$ will produce the maximum power to the heater element, such power being dissipated substantially as heat to increase the temperature of the heater element.

As the temperature of the heater element 12 increases, the resistivity of the heater element will decrease (since the element has a negative temperature coefficient of resistivity). Since the current is held constant, as resistance decreases, so will the power produced and dissipated as heat decrease. (The constant current mode of operation of the heater system power source is denoted on the figure by the arrowed line identified by reference numeral 30.) Consequently, the temperature of the heater element 12 will increase less rapidly as the heater element nears its set temperature $T_f$ (corresponding to the resistance $R_f$). Once the temperature of the heater element 12 does reach its set point, the heater system 10 might employ resistance control to maintain the resistance of the heater element at $R_f$ while attenuating the supplied current and voltage to the equilibrium level. (The constant resistance control portion of operation is identified on the figure by reference numeral 32.) Such a system suffers from a relatively long heat up time, as the power is continually decreasing as the temperature of the heater element increases, and from an inability to easily regulate its set temperature in response to relatively light thermal loading, since a small change in thermal loading will force the power supply out of constant resistance control and back into constant current control.

The heater system 10 of the present invention provides faster heat up and greater temperature control than conventional heater systems, yet is settable to temperatures over a broad range. The heater system 10 of the present invention includes a heater element 12 with a large temperature coefficient of resistance (negative or positive) over the entire range of intended settable temperatures and a power supply 14. The power supply 14 includes means for controlling its output during heat up along a path bounded by two preferred paths:

1) a path defined by constant voltage with a crossover to constant current for a NTCR heater element 12 when the power output reaches a maximum or a path defined by constant current with a crossover to constant voltage for a PTCR heater element when the power output reaches a maximum; and 2) a path defined by constant power with a cross-over to maximum current for a NTCR heater element or to constant voltage for a PTCR heater element when the power supply reaches maximum current or maximum voltage output, respectively. When the heater element 12 reaches the set control temperature, the power supply 14 then maintains power equilibrium with the thermal load by controlling its output according to resistance control, i.e., attenuating the current and voltage to maintain the resistance of the heater element at the set point resistance (reference resistance).

While the following discussion is made with reference to a specific embodiment of the present invention, that employing a NTCR heater element, it will be appreciated by a person having ordinary skill in the art that the invention is equally applicable to other types of heater elements, such as PTCR heater elements.

Figure 6:
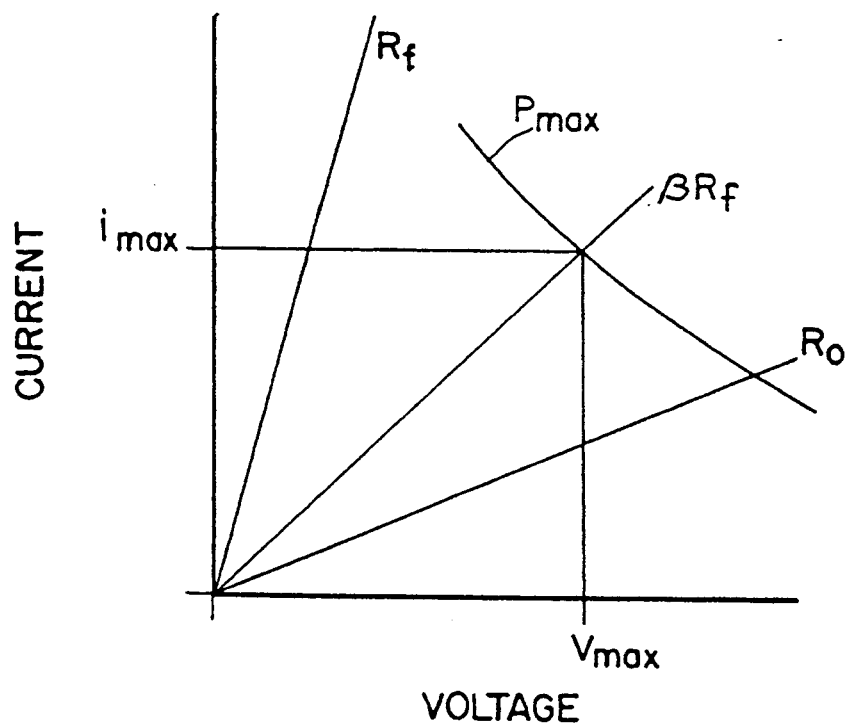
FIG. 6 is a graph of current as a function of voltage illustrating parameters of the self-regulating heater system of the present invention.

Turning now to FIG. 6, there is illustrated a graph of current as a function of voltage for a power supply designed in accordance with the present invention. The axes and the lines labelled as $P_{max}$, $R_f$ and $R_o$ in FIG. 6 have the same definitions as the corresponding axes and lines in FIGS. 4 and 5. The power supply 14 of the present invention is designed to operate at a maximum current $i_{max}$ and a maximum voltage $V_{max}$ as determined by the expression $V_{max}/i_{max}\beta*R_f$, where $\beta$ is a value found to minimize the heat up time to the set temperature $T_f$ having a resistance of $R_f$. The values of $V_{max}$ and $i_{max}$ are related by the equation $V_{max}/i_{max}=(-\beta/\alpha) R_o$. For a given $P_{max}$, a preferred power supply 14 designed in accordance with the present invention will have an $i_{max}$ and $V_{max}$ determined by the equations: and $$i_{max} = (\sqrt{P_{max}/R_o})/(\sqrt{\beta/\alpha})$$

$$V_{max} = (\sqrt{P_{max}*R_o})*(\sqrt{\beta/\alpha})$$

For power supplies 14 configured in accordance with the invention the value of $\beta/\alpha$ will generally and preferably be less than 1. Therefore, for heater systems designed within the same maximum power constraint, a heater system 10 designed in accordance with the present invention will typically have a lower maximum voltage and a larger maximum current than will a conventional heater system, by a factor of the square root of the quantity $\beta/\alpha$.

It has been found experimentally that the factor $\beta/\alpha$ will typically and preferably range between 0.3 and 0.8 for the present invention. This range applies for a heater element 12 with a resistance ratio $\alpha$ greater than or equal to approximately 3 and in applications where the normalized temperature range $\Gamma$ is greater than or equal to approximately $\frac{1}{4}$. For low resistance ratios $\alpha$ and low normalized temperature ranges $\Gamma$ the advantages of the invention are minimized. For low $\Gamma$ and high $\alpha$, constant current control, such as is done in some conventional systems, provides the best heat up time and power response.

Figure 7:
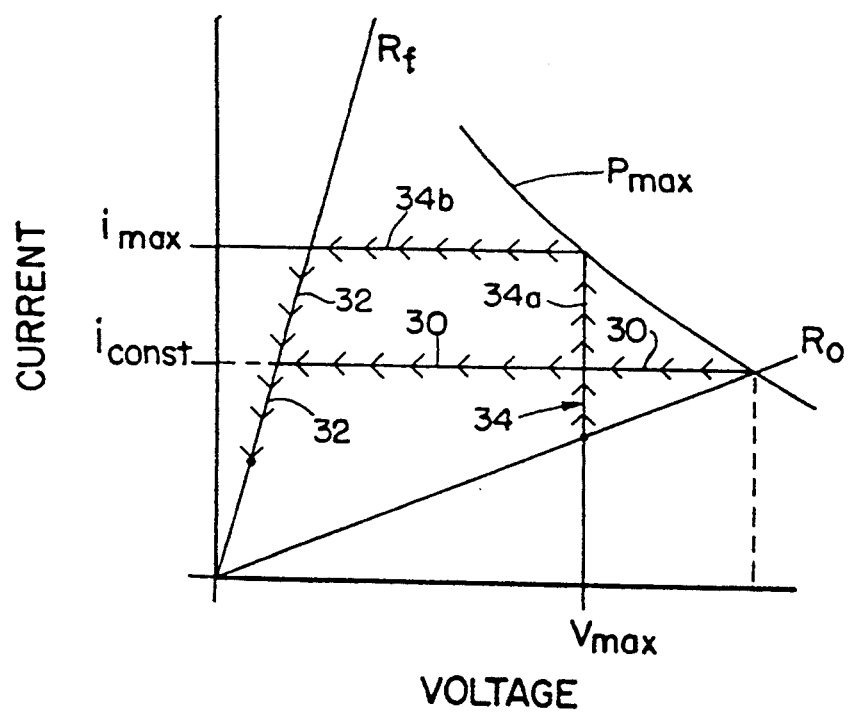
FIG. 7 is a graph of current as a function of voltage comparing one preferred heating path of the present invention to the heating path of a prior art constant current heater system.

Turning to FIG. 7, there is shown a graphical representation of a preferred constant voltage with cross-over to constant current heat up path 34 for a heater system 10 employing a NTCR heater element 12 and a power supply 14 designed in accordance with the present invention. Also depicted in FIG. 7 is a constant current heat up path 30 of a typical conventional heater system designed to operate at the same maximum power limitation, $P_{max}$. With the heater element 12 at the resistance $R_o$, power is supplied by the power supply 14 to the heater element at maximum voltage $V_{max}$. The power supply 14 will maintain the power supplied to the heater element 12 at the constant maximum voltage $V_{max}$ (shown as arrowed line 34a) until the maximum current $i_{max}$ is reached, which is also at maximum power output $P_{max}$. The power supply 14 then crosses over to operate at maximum current $i_{max}$ (shown by arrowed line 34b). The power output is maintained at constant maximum current $i_{max}$ until the set temperature $T_f$, corresponding to a resistance of $R_f$, is reached. The power supply 14 then operates at constant resistance control 32 maintaining the resistance of the heater element at $R_f$ and, thus, at the desired temperature while attenuating the current and voltage supplied to the heater element. Comparing the control path 34 of the heater system 10 of the present invention to that illustrated for a conventional heater system employing a constant current control path 30, it is seen that the controlled current portion 34b of the control path 34 for the present invention is at a much larger value than the constant current control path 30 for the conventional heater system. The heater system 10 of the present invention thus provides greater power response over the conventional heater system. Further, the constant resistance control portion 32 of the path is broader, thus the present system can accommodate larger thermal loading variances without affecting the set temperature $T_f$ and without returning to constant current control.

Figure 8:
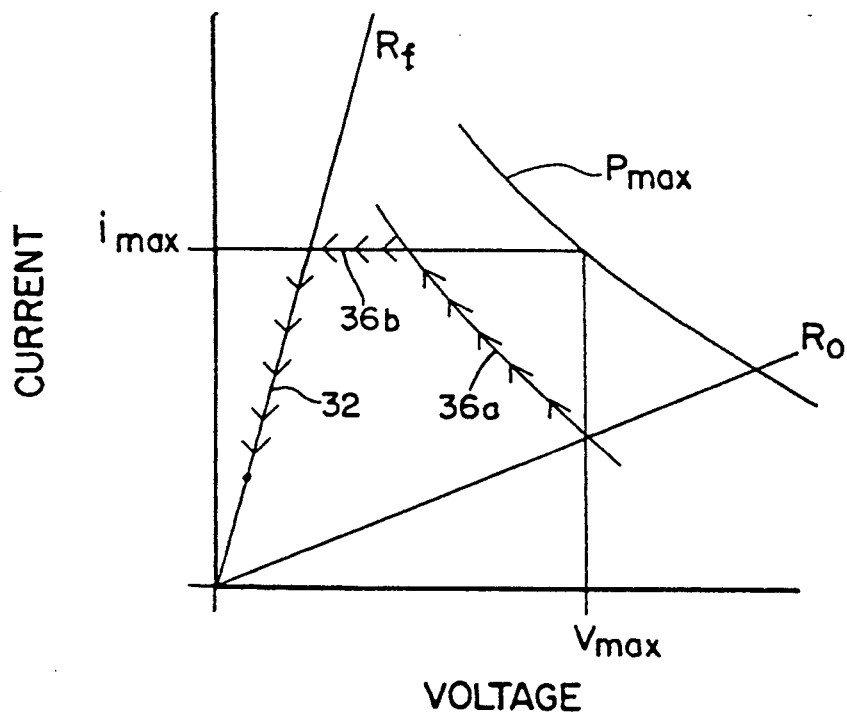
FIG. 8 is a graph of current as a function of voltage representing a constant power control path which may be employed by the present invention.

Another control path embodied in the present invention is graphically illustrated in FIG. 8. In this instance during the initial phase of heat up the power supply 14 provides the output power to the heater element 12 at a constant value (shown by the arrowed line 36a) as the temperature of the heater element 12 increases until the maximum current value $i_{max}$ is reached. The power supply 14 then maintains the power supplied to the heater element 12 at constant maximum current $i_{max}$ (shown by arrowed line 36b) until the temperature of the heater element has increased to the point where the heater element is at the set point resistance $R_f$. Constant resistance control 32 is then provided.

Figure 9:
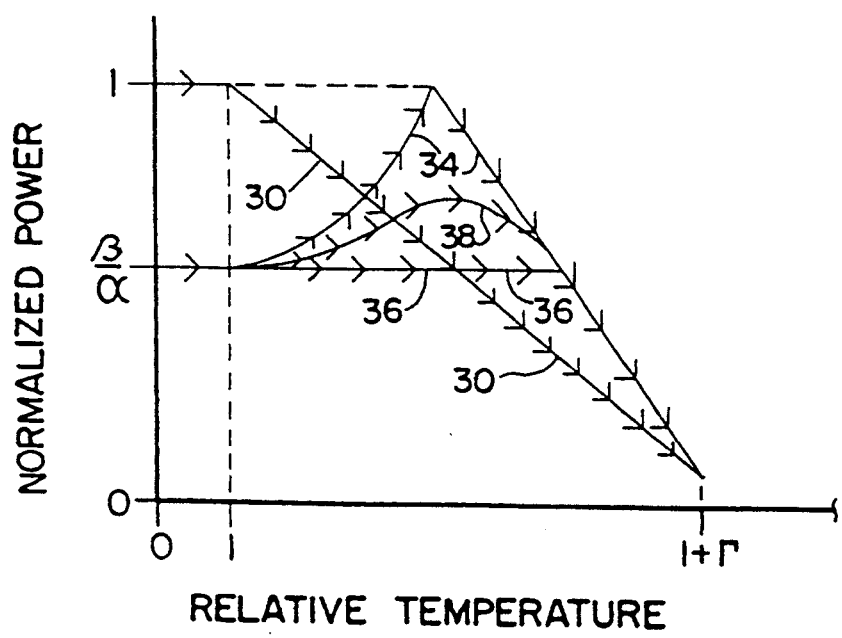
FIG. 9 is a graph of normalized power as a function of relative temperature comparing a number of control paths of the present invention to a constant current control path of a prior art heating system.

All control paths lying between the two paths 34 and 36 described above for the present invention are considered optimal paths relative to prior art teachings, such as that of constant current as shown in FIG. 5. FIG. 9 depicts the power-temperature characteristics of the possible control paths embodied in the present heater system. These characteristics are graphically presented as normalized power (vertical axis) versus relative temperature (horizontal axis). In the figure, path 34 is a constant voltage with cross-over to constant current control path; path 36 is a constant power with cross-over to constant current control path; path 38 represents any control path bounded by paths 34 and 36; and path 30 is a conventional constant current control path. In this type of presentation it can be seen that the control paths that are defined within the scope of this invention (paths 34, 36 and 38) provide during heat up higher power responses than the prior art constant current control path (path 30) over a broad range of settable temperatures.

Some self regulating heater systems exhibit a resistance between $T_{amb}$ and $T_o$ which materially changes with temperature and cannot accurately be represented as a constant value $R_o$. NTCR heater elements often exhibit a PTC resistance characteristic in this temperature range, and conversely, PTCR heater elements often exhibit a NTC resistance characteristic in the same temperature range.

Figure 2B:
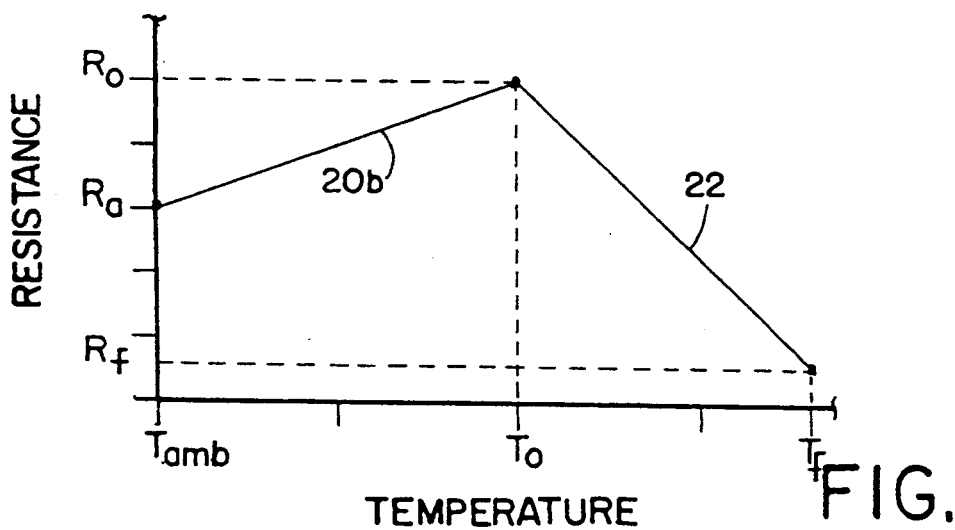
Figure 3B:
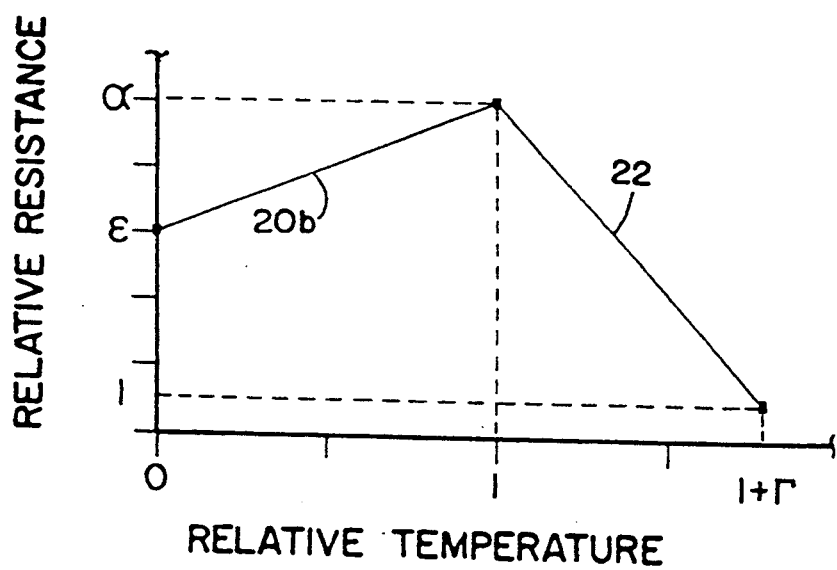

For a typical NTCR heater element this resistance behavior is illustrated in FIG. 2b. At $T_{amb}$ the resistance value is $R_a$ and during heating up, the heater element resistance will proceed along the line 20b until temperature $T_o$ is reached. This resistance-temperature characteristic is shown in FIG. 3b in terms of relative resistance versus relative temperature. The parameter $\epsilon$ is the ratio $R_f/R_a$.

It has also been experimentally found for self regulating heater elements where the ratio $\beta/\alpha$ is typically between $\frac{1}{4}$ and 1 that faster heat up and greater temperature control results when $\epsilon/\alpha$ is typically and preferably between 0.3 and 0.8, and the power supply controls the electrical power supplied to the heater element in accordance with the aspects of the present invention. This range applies for a heater element 12 with a resistance ratio $\alpha$ greater than or equal to approximately 3 and in applications where the normalized temperature range $\Gamma$ is greater than or equal to approximately 1/15.

Figure 10:
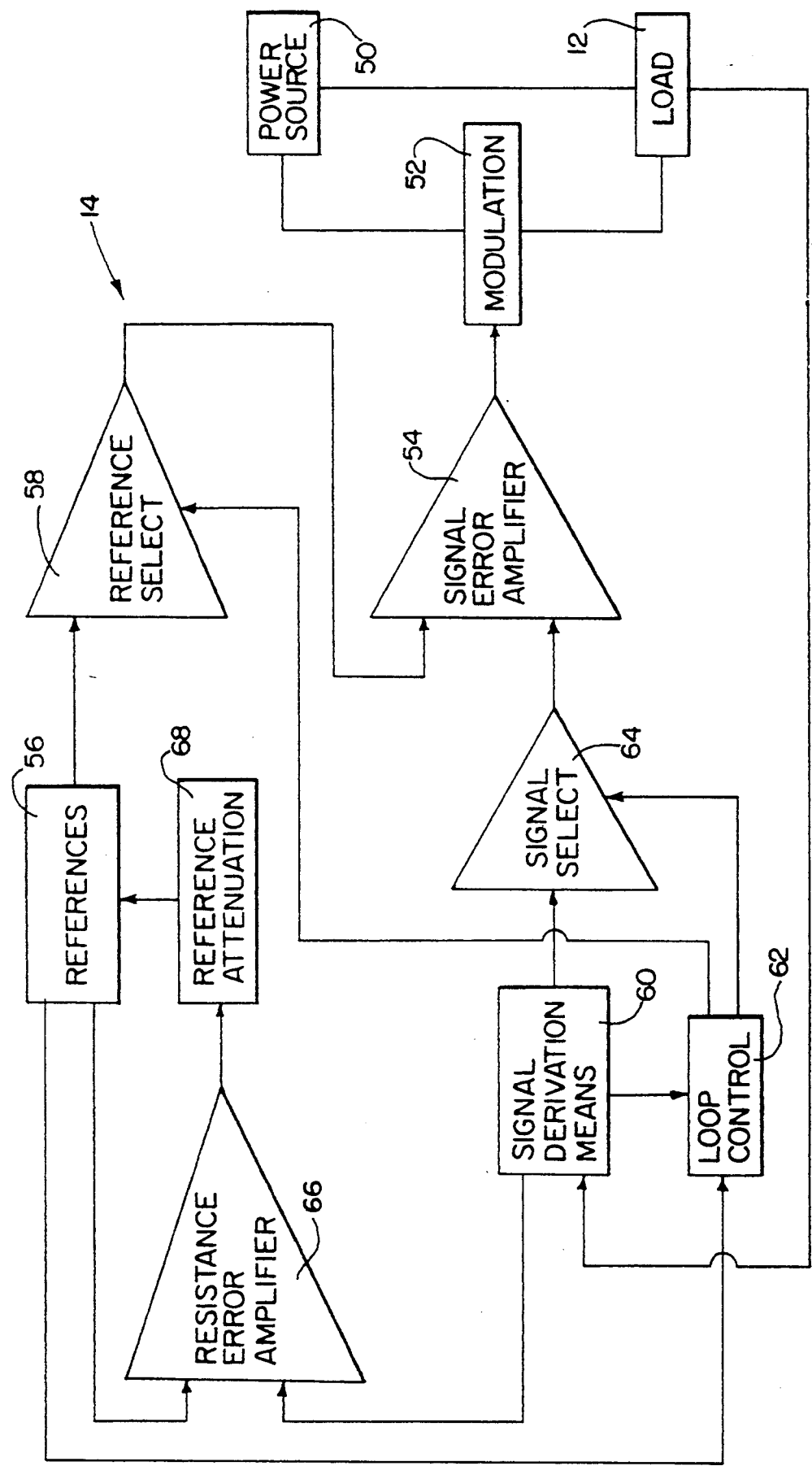
FIG. 10 is a functional diagram of a power supply designed in accordance with the present invention for providing power to an NTCR heater element.

Referring to FIG. 10 there is shown a functional diagram of the power supply 14 capable of operating along paths 34 or 36 as shown in FIG. 9. The power supply 14 includes a power source 50 from which the power supplied to the heater element 12 is drawn. Flow of electrical power from the power source 50 to the heater element 12 is modulated by a modulator function 52. The modulator function 52 is controlled by the signal error amplifier function 54 which compares the appropriate real time signal, i.e., the current in the load, the voltage across the load or the power supplied into the load, to corresponding reference values. The reference values are provided to the signal error amplifier function 54 from the reference function 56 through the reference selector function 58 that determines to which reference signal the current real time signal is to be compared. The real time signal from the heater element 12 is provided to signal derivation function 60 which represents in real time the current in the load, the voltage across the load, the power into the load, and also the real time value of load resistance.

The real time components of the signal are provided to the loop control function 62 which determines in which portion of a control path the power supply 14 is operating, for either of the control paths 34 or 36 as shown in FIG. 9. If, for example, the power supply 14 is to operate along control path 34, the loop control function 62 would determine if the power supply 14 is operating at constant voltage, constant current, or constant resistance. The loop control function 62 then informs signal select function 64 which real time signal, i.e., current, voltage, or power is to be supplied to the signal error amplifier function 54 from the signal derivation function 60. The loop control function 62 also determines which reference signal is to be provided to the signal error amplifier function 54 from the reference function 56 through the reference select function 58.

The signal derivation function 60 also provides the real time value of load resistance to the resistance error amplifier function 66 which compares the real time value of load resistance to the reference resistance value from the reference function 56. When the real time resistance becomes equal to the set point resistance, thus indicating that the heater element is at the set temperature, reference attenuation function 68 will begin attenuating the voltage reference signal and current reference signal to the extent that the real time resistance remains at the set point value. This situation occurs during the constant resistance portion of the control path, the signal controlling the modulator function 52 being attenuated and, in turn, the electrical power delivered to the load being reduced to the extent that the real time load resistance remains at the set point reference resistance value.

Figure 11:
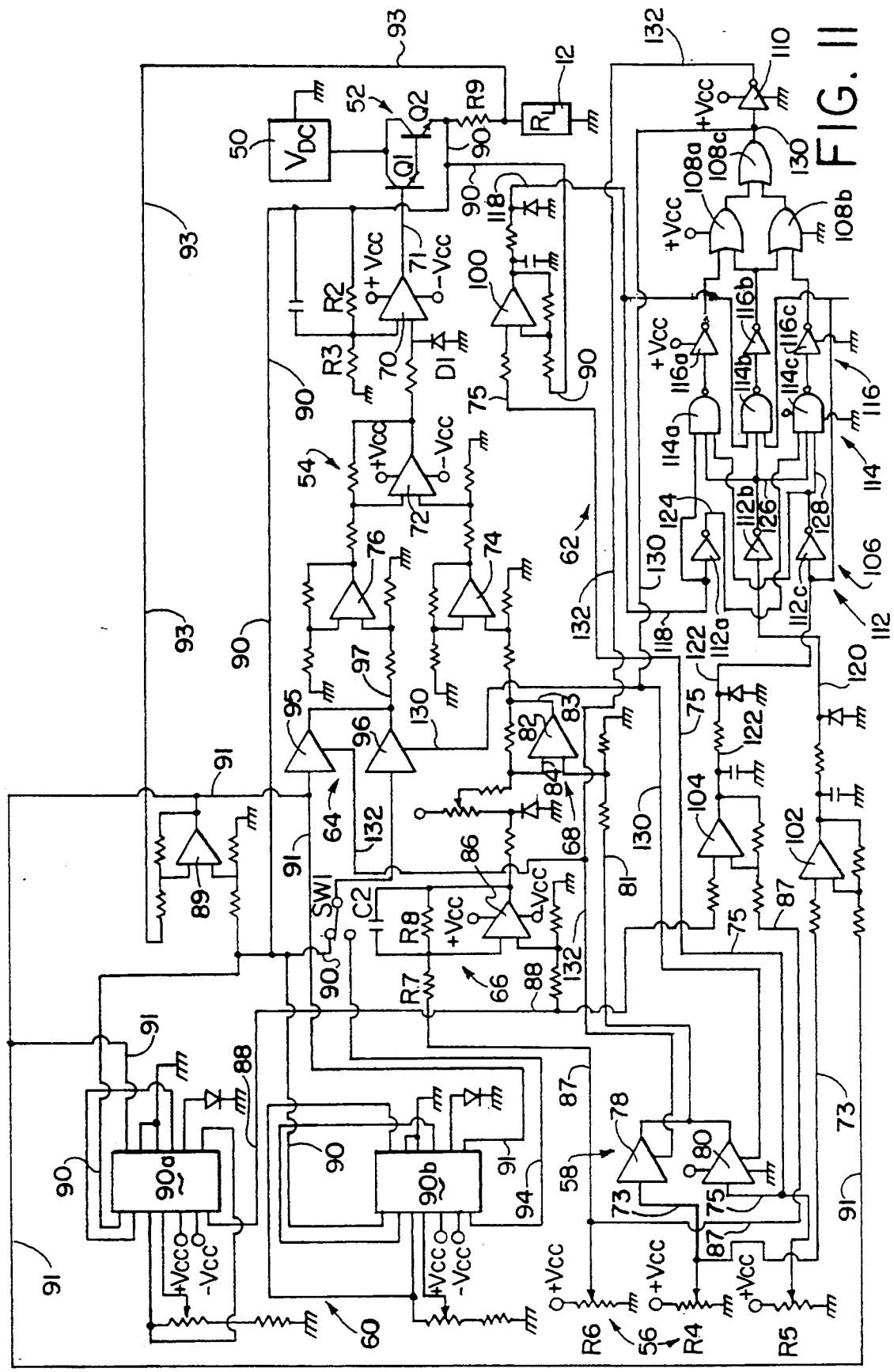
FIG. 11 is an electrical schematic diagram of a circuit configured to perform the functions shown in FIG. 9.

A schematic diagram of an exemplary circuit performing the functions described relative to FIG. 10 is shown in FIG. 11. (In the following discussion, the line, conductor, or the like carrying an electrical signal will be designated a specific reference numeral which is also intended to identify the electrical signal carried upon it.) The power source 50 is a constant voltage direct current power source. The power modulator function 52 is implemented by pass transistors Q1 and Q2 configured in a Darlington arrangement which modulate the power supplied to the heater element 12 from the power source 50. The signal error amplifier function 54 is implemented in operational amplifiers 70, 72, 74 and 76. The gain of the signal error amplifier function 54 is largely determined by the feedback network comprising resistors R2 and R3. Capacitor C1 is chosen to sufficiently roll off the gain to avoid oscillations. Diode D1 prevents the output 71 of operational amplifier 70 from driving the base of pass transistor Q1 excessively negative.

The current and voltage reference signals 73 and 75 of the reference function 56 are derived from potentiometers R4 or R5, respectively selected with analog switches 78 and 80. The reference signal to be provided to the signal error amplifier means 54 is determined by outputs from the loop control means 62 provided to the current reference analog switch 78 and voltage reference analog switch 80. The output of analog switches 78 and 80, namely the current and voltage reference signals respectively, are applied to the signal error amplifier means 54 through an operational amplifier 82 over line 83. Operational amplifier 82 provides the reference attenuation function 68 which attenuates the voltage or current reference signals to the extent that the real time load resistance remains at the reference resistance value. Operational amplifier 82 provides for the signal reference attenuation by application of an amplified resistance error signal to its subtracting input over line 84.

The resistance error signal is derived and amplified by operational amplifier 86 based on the resistance reference signal 87 derived from potentiometer R6 and the real time resistance signal 88 derived from the signal derivation means 60 which is described below. This error signal constitutes another loop with gain largely determined by resistors R7 and R8 and frequency roll off determined by capacitor C2. The output of operational amplifier 82, which will be an attenuated or non-attenuated voltage or current reference signal, is provided to the operational amplifier 74 of the signal error amplifier means 54 over line 85.

The signal derivation function 60 is implemented by operational amplifier 89, real time analog computational units 90a and 90b, current measuring resistor R9, and the real time voltage sensing line 90 connected to the emitter of pass transistor Q2. The voltage sensing line 90 is inherently a real time signal. Operational amplifier 89 develops a real time load current signal 91 based on the real time signals received over voltage sensing line 90 and a line 93 which senses the current input to the heater element 12. Computational unit 90a receives the real time load current signal 91 and the real time voltage signal 90 and develops a real time load resistance signal 88. Analog computational unit 90b receives the real time voltage signal 90 and the real time load current signal 91 derived by operational amplifier 89 and develops a real time load power signal over line 94. The real time voltage, current or power signals are selected and applied to operational amplifier 76 of the signal error amplifier means 54 through analog switches 95 and 96 over line 97, as determined by switch SW1 and the loop control means 62, described below.

The loop control function 62 is implemented in operational amplifiers 100, 102 and 104, a three channel logic arrangement 106, a sequence of OR gates 108 and a hex invertor 110. Each channel of the three channel logic function 106 includes sequentially a hex invertor 112, a triple NAND gate 114 and a further hex inventor 116. Operational amplifiers 100, 102 and 104 are configured as comparators and each is provided with different real time and corresponding reference signals. Operational amplifier 100 is provided with the real time voltage signal 90 and the voltage reference signal 75 as determined by potentiometer R5. The output 118 of operational amplifier 100 (identified in the truth table below as input V) is provided to hex invertor 112a and triple NAND gate 114a of the first channel of the logic arrangement 106. Comparator 102 is provided with the real time current signal 91 derived from operational amplifier 89 and the current reference signal 73 determined by potentiometer R4. The output 120 of the operational amplifier 102 (identified in the truth table below as input I) is provided to the hex invertor 112b of the second channel of the logic arrangement 106. Operational amplifier 104 is provided with the real time resistance signal 88 derived from real time analog computational unit 90a and the resistance reference signal 87 determined by potentiometer R6. The output 122 of the operational amplifier 104 (identified in the truth table below as input R) is provided to the hex invertor 112c of the third channel of the logic arrangement 106 and to the triple NAND gate 114b of the second channel.

Hex invertor 112a of the first channel provides its output 124 to the triple NAND gate 114c of the third channel. The hex invertor 112b of the second channel provides its output 126 to all three triple NAND gates 114a–c, while the hex invertor 112c of the third channel provides its output 128 to the triple NAND gate 114c of the same channel as well as the triple NAND gate 114a of the first channel. Each triple NAND gate 114a-c provides its output to a hex invertor 116a-c of the same channel. The output of hex invertors 116a and 116c are provided to separate quad OR devices 108a and 108b, respectively. The output of hex invertor 116b is provided to both quad OR devices 108a and 108b. The output of each quad OR device 108a and 108b is provided to an additional quad OR device 108c. The output 130 of quad OR device 108c controls whether analog switches 80 and 96 are in their open or closed states. The output 130 is also provided to hex invertor 110. Hex invertor 110 produces an output 132 which controls analog switches 78 and 95.

| | State Variable | |
|---|---|---|
| | Input Value = 1 | Input Value = 0 |
| | V approx. equal to $V_f$ | V less than $V_f$ |
| | I approx. equal to $I_f$ | I less than $I_f$ |
| | R approx. equal to $R_f$ | R greater than $R_r$ |

This definition of circuit states leads to the following truth table for analog switch selection:

| Truth Table | | | | |
|---|---|---|---|---|
| Input | | | Output | |
| V | I | R | select I | Select V |
| 1 | 0 | 0 | 0 | 1 |
| 0 | 1 | 0 | 1 | 0 |
| 0 | 0 | 1 | 1 | 0 |
| 1 | 0 | 1 | 0 | 1 |
| 0 | 1 | 1 | 1 | 0 |
| 1 | 1 | 0 | 1 | 0 |
| 0 | 0 | 0 | 0 | 1 |
| 1 | 1 | 1 | 1 | 0 |

When switch SW1 is positioned as shown in FIG. 11 the circuit will modulate the power source 50 to supply power to the heating element 12 along the control path 34 shown in FIG. 9. When switch SW1 is repositioned to its other position, thus supplying the real time power signal derived by analog computational unit 90b to analog switch 96, the circuit will modulate the power from the power source 50 to supply the heating element 12 with power along the control path identified as 36 in FIG. 9. In this latter instance the voltage V in the truth table above is replaced with power P. Otherwise the circuit operates in the same fashion. In this case potentiometer R5 represents the power reference signal.

To demonstrate the attributes of the invention two heater elements having different physical sizes and masses yet very similar NTCR characteristics were tested with a power supply supplying power along the control paths 34 and 36 as shown in FIG. 9 in accordance with the present invention and along control path 30 which represents a conventional constant current control path. The first heater element, designated below as HI, was rated at 10 ohms at 25° C., had a diameter of 0.32 inches and possessed no encapsulation. The second heater element, designated below as H2, was rated at 10 ohms at 25° C., had a diameter of 0.74 inches and possessed encapsulation.

Figure 12:
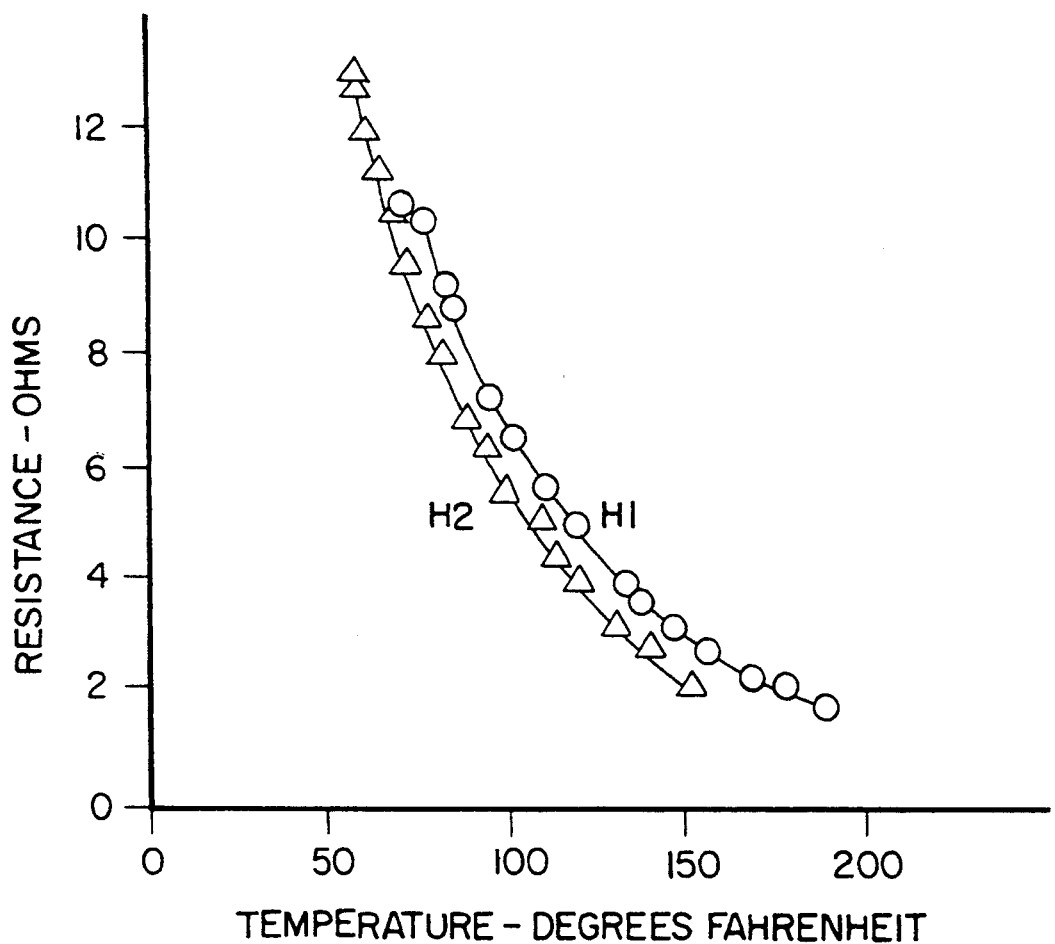
FIG. 12 is a graph of resistance as a function of temperature illustrating the resistance-temperature path for two separate heater elements.

The resistances of both heater elements H1 and H2 were measured as a function of temperature and these results were plotted on the graph shown in FIG. 12. Since FIG. 12 shows both resistance elements H1 and H2 to have very similar resistance-temperature characteristics, their performance differences should primarily be due to their size. Heater element H2, because of its greater size and mass, can be expected to have a much larger thermal dissipation constant than heater element H1. Likewise, heater element H2 will be slower to heat up and will dissipate more power at equilibrium than heater element H1.

In accordance with this invention for a given power rating $P_{max}$ of the power supply, the subsequent design choices of $I_{max}$ and $V_{max}$ should be based on a choice of $\beta/\alpha$ between 0.3 and 0.8. This range applies to heater elements with a resistance ratio $\alpha$ greater than or equal to 3 and a normalized temperature range $\Gamma$ greater than or equal to 0.25. The operating temperature range is taken from approximately 70° F. ($T_o$) to approximately 150° F. ($T_f$). Therefore the heater elements HI, H2 will vary from approximately 10 ohms ($R_o$) to 3 ohms ($R_f$), as is shown in FIG. 12. This resistance range defines $\alpha$ to be 10/3 or approximately 3.3. Since the ambient temperature ($T_{amb}$) during the test was also 70° F., then the normalized temperature range $\Gamma$ is a very large number (certainly greater than 0.25). Hence the criteria for picking $\beta/\alpha$ in the preferred range is met. A more detailed analysis which estimates the heat up time and uses the values $\alpha=3.3$ and $\Gamma=$infinity suggests that a good choice of $\beta/\alpha$ is 0.6.

For the purposes of this test, a power supply of 8 watts nominally was chosen. The relationships of $I_{max}$ and $V_{max}$ for a power supply designed in accordance with the present invention as discussed above will result in an $I_{max}$ and $V_{max}$ as shown below:

$$i_{max} = \sqrt{(8 \text{ watts}/10 \text{ ohms})} / \sqrt{(0.6)} = 1.15 \text{ amps}$$

$$V_{max} = \sqrt{8 \text{ watts}*10 \text{ ohms}} * \sqrt{0.6} = 6.93 \text{ volts}$$

For a prior an constant current power supply limited to 8 watts nominally, $I_{max}$ and $V_{max}$ would be chosen according to the following equations:

$$i_{max} = \sqrt{8 \text{ watts}/10 \text{ ohms}} = .89 \text{ amps}$$

$$V_{max} = \sqrt{8 \text{ watts}*10 \text{ ohms}} = 8.94 \text{ volts}$$

For each of the three control paths 30, 34 and 38, heater elements H1 and H2 were connected to the power supply, and a time for each heater element to heat up was measured. Heat up time was judged by when the resistance control feature operated. Results were as follows:

| | Heat Up Time (seconds) | | |
|---|---|---|---|
| Heater | cv/cc | cp/cc | cc |
| H1 | 1.8 | 2.1 | 2.7 |
| H2 | 17 | 20 | 25 |

In the table, cv/cc represents a control path employing constant voltage with a cross over to constant current at maximum power (path 34 in FIG. 9), cp/cc represents a control path following constant power with a cross over to constant current when maximum current is reached (path 36 in FIG. 9), and cc represents conventional constant current power control (path 30 in FIG. 9). These results clearly show that the heat up time for a heater system designed in accordance with the present invention is improved over prior art constant current heater system methods. As expected, heater element H1, which is smaller than heater element H2, had a heat up time which is much shorter than that for heater element H2.

Another attribute tested was the ability of the heater systems to hold operating temperatures under the application of a large thermal load. For each of the control paths 30, 34 and 36 and each of the heater elements H 1 and H2, the following test was conducted. The heater element was operated and equilibrated in a free, still air environment. The air temperature was nominally room temperature. Load power was recorded and the load resistance was confirmed to be operating at the set point resistance. A large forced air thermal load was then applied to the heater element. After equilibration the load power and load resistance were recorded. The results of this test are presented in the following table:

| Heater | Load Power and Load Resistance | | | |
| --- | --- | --- | --- | --- |
|  | all paths still air | cv/cc path forced air | cp/cc path forced air | cc path forced air |
| H1 | 0.4 w. | 3.8 w. | 3.6 w. | 3.0 w. |
|  | 2.92 ohms | 2.9 ohms | 2.92 ohms | 3.47 ohms |
| H2 | 1.2 w. | 5.4 w. | 4.8 w. | 4.1 w. |
|  | 2.94 ohms | 3.56 ohms | 4.31 ohms | 4.78 ohms |

The results clearly show that the subject invention heater system provides greater power response and closer temperature (resistance) control than prior art constant current systems under conditions of similar power supply capacity. The tables illustrate that the constant voltage with a cross over to constant current control is the most preferred control path followed by the constant power with a cross over to constant current control path. A continuum of control paths lying between these paths would also provide better results than the conventional constant current control path.

What is claimed is:

1. A self-regulating heater, comprising:
resistance means for converting electrical power to thermal energy, said resistance means having a negative temperature coefficient of resistance; and
power supply means for supplying electrical power to said resistance means; said power means including feedback control means for controlling the electrical power supplied to said resistance means along a first path bounded by second and third paths as a function of the real time energy consumption rate of said resistance means, said second path defined by constant voltage, with a cross-over to constant current when the power output reaches a maximum, and said third path being defined by constant power with a cross-over to maximum current when the power supply reaches maximum current.

2. The heater of claim 1, wherein said means for controlling includes means for maintaining power equilibrium with a thermal load through controlling the current and voltage of the power supplied to maintain the resistance of the heater element at a predetermined value.

3. The heater of claim 1, wherein said resistance means has a negative TCR.

4. A self-regulating heater, comprising:
resistance means for converting electrical power to thermal energy, said resistance means having a positive temperature coefficient of resistance; and
power supply means for supplying electrical power to said resistance means; said power means including feedback control means for controlling the electrical power supplied to said resistance means along a first path bounded by second and third paths as a function of the energy consumption rate of said resistance means, said second path defined by consrot current, with a cross-over to constant voltage when the power output reaches a maximum, and said third path being defined by constant power with a cross-over to maximum voltage when the power supply reaches maximum voltage.

5. The heater of claim 4, wherein said resistance means has a positive TCR.

6. A method of supplying electrical power to a resistance heating element having a negative temperature coefficient of resistance, comprising the step of controlling such electrical power along a first path bounded by second and third paths as a function of a feedback signal indicating the energy consumption rate of said resistance heating element, said second path defined by constant voltage, with a cross-over to constant current when the power output reaches a maximum, and said third path being defined by constant power with a cross-over to maximum current when the power supply reaches maximum current.

7. The method of claim 6, further including the step of maintaining power equilibrium with a thermal load through controlling the current and voltage of the power supplied to maintain the resistance of the heater element at a predetermined value once the resistance heating element has reached a predetermined temperature.

8. The method of claim 6, wherein said resistance means has a negative TCR.

9. A method of supplying electrical power to a resistance heating element having a positive temperature coefficient of resistance, comprising the step of controlling such electrical power along a first path bounded by second and third paths as a function of a feedback signal indicating the energy consumption rate of said resistance heating element, said second path defined by constant current, with a cross over to constant voltage when the power output reaches a maximum, and said third path being defined by constant power with a cross-over to maximum voltage when the power supply reaches maximum voltage.

10. The method of claim 9, wherein said resistance means has a positive TCR.

11. A self-regulating power supply for use with a TCR heater element, comprising a source of electrical power and a feedback control circuit, said feedback control circuit controlling the voltage and current supplied by said source of electrical power to said heater element as a function of the energy consumption rate of said heater element such that upon heat up of the heater element one of the supplied voltage and current is first maintained at a preselected maximum until a preselected maximum power level is attained, at which point the other of the supplied voltage and current is maintained at a preselected maximum at least until a reference resistance is reached, said reference resistance corresponding to a selected temperature to be maintained by said heater.

12. The power supply of claim 11, in combination with a TCR heater element.

13. A self-regulating power supply for use with a TCR heater element, comprising a source of electrical power and a feedback control circuit, said feedback control circuit controlling voltage and current supplied by said source of electrical power to said heater element as a function of the energy consumption rate of said heater element such that upon heat up of the heater element the voltage and current are controlled to apply preselected maximum power until a preselected maximum current level is attained, at which point supplied current is maintained at said preselected maximum current until a reference resistance is reached, said reference resistance corresponding to a selected temperature to be maintained by said heater.

14. The power supply of claim 13, in combination with a TCR heater element.

* * * * *